(12) United States Patent
Birkhäuser

(10) Patent No.: US 6,367,002 B1
(45) Date of Patent: Apr. 2, 2002

(54) APPARATUS AND METHOD FOR FETCHING INSTRUCTIONS FOR A PROGRAM-CONTROLLED UNIT

(75) Inventor: Jürgen Birkhäuser, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/250,365

(22) Filed: Feb. 12, 1999

(30) Foreign Application Priority Data

Feb. 12, 1998 (DE) .......................................... 198 05 784

(51) Int. Cl.[7] .......................... G06F 9/30; G06F 12/02; G06F 9/06
(52) U.S. Cl. ........................ 712/206; 712/745; 712/214; 712/211; 711/125; 711/173; 711/129; 711/209
(58) Field of Search ................................. 712/207, 201, 712/209, 230, 210, 211, 212, 214, 215, 213, 706, 204, 228, 237, 245, 248, 117, 216, 206, 225; 710/52, 56, 54, 130, 107, 209; 711/125, 129, 130, 148, 153, 173, 137, 147; 714/48

(56) References Cited

U.S. PATENT DOCUMENTS 5,463,748 A * 10/1995 Schwendinger ............. 712/204
5,872,946 A * 2/1999 Narayan et al. ............ 712/704

FOREIGN PATENT DOCUMENTS

DE 4222776 A1 1/1993

* cited by examiner

Primary Examiner—Daniel H. Pan

(57) ABSTRACT

An apparatus and a method are distinguished in that an instruction queue is provided which is configured such that when instruction data are written into the instruction queue and/or when instruction data are read out of the instruction queue, a plurality of defined points within the instruction queue are made to start up selectively. As a result, the incidence of pauses in program execution can be reduced to a minimum.

16 Claims, 1 Drawing Sheet

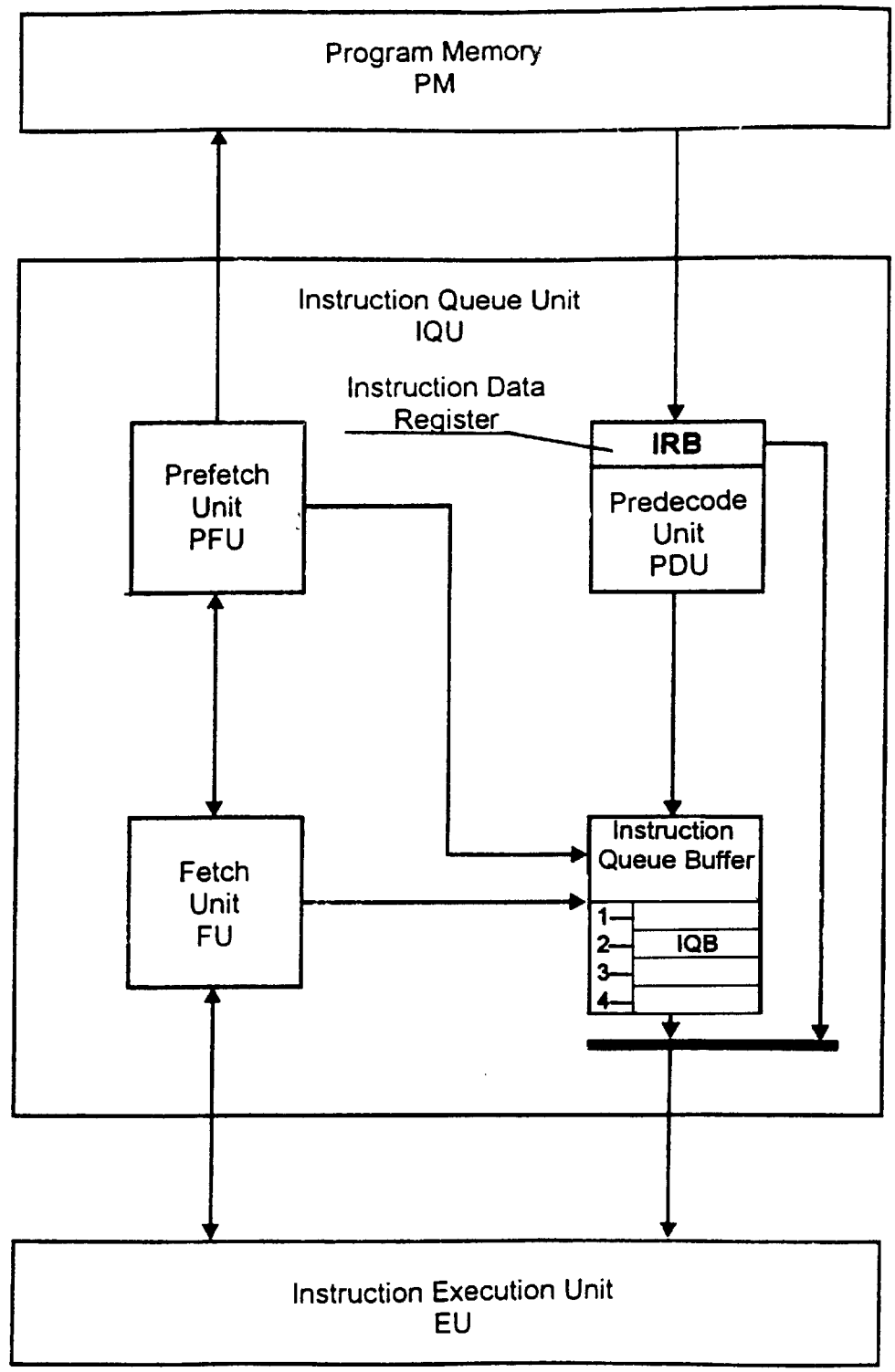

APPARATUS AND METHOD FOR FETCHING INSTRUCTIONS FOR A PROGRAM-CONTROLLED UNIT

BACKGROUND OF THE INVENTION

1. Field of the Invention

The present invention relates to an apparatus that is, to an apparatus and a method for retrieving instructions for a program-controlled unit, having an instruction queue for furnishing instruction data retrieved previously from a program memory.

The program-controlled unit to be supplied with instruction data by the apparatus or the method is for instance a microprocessor, microcontroller, or the like.

The instruction queue is a component of the instruction retrieval device of the program-controlled unit. It is configured for buffer storage of many instruction data representing instructions and outputting them as needed, that is, when the execution of the applicable instruction is incipient, to an instruction execution unit of the program-controlled unit.

The instruction data written into the instruction queue are read out from the program memory provided either inside or outside the program-controlled unit. Fetching the instruction data from the program memory and writing them into the instruction queue are done without interruption, and as a rule independently of the rhythm at which the program-controlled unit, or more specifically its instruction execution unit, executes the instructions. The process is interrupted only if any instructions still to be executed would thereby be overwritten in the instruction queue.

It proves to be advantageous to furnish instruction data representing instructions in the instruction queue, because the instruction queue permits very rapid access to the instruction data, and thus the instruction execution unit of the program controlled unit thus seldom or never needs to wait for very long for the instruction data representing the next instruction.

However, this is true only if and as long as the instructions are executed in the order in which they are stored in the program memory and thus also in the instruction queue, which in turn is true only if and as long as no jump instructions, task changes, interrupts, and so forth occur in the program execution. In the case of the non-address-sequential program execution occurring in such cases, the instruction data already furnished in the instruction queue can no longer be used, because after all in any case they derive randomly from the address at which the instruction, to be executed after a jump or the like, is to be retrieved. Such events are usually reacted to in the form of a so-called queue flush, the result of which is that the data furnished in the instruction queue are discarded, and the readout of instruction data from the program memory (and their writing into the instruction queue) are continued from the target address of the jump onward.

In such situations, a pause occurs in the program execution, because the instruction data representing the instruction to be executed after a jump or the like must after all first then be retrieved from the normally comparatively low-speed program memory.

SUMMARY OF THE INVENTION

It is accordingly an object of the invention to provide an apparatus and a method for fetching instructions for a program-controlled unit that overcomes the above-mentioned disadvantages of the prior art devices and methods of this general type, in which the incidence of pauses in program execution is reduced to a minimum.

With the foregoing and other objects in view there is provided, in accordance with the invention, an apparatus for retrieving instructions for a program-controlled unit having a program memory, including: an instruction queue unit having a plurality of defined points for storing and furnishing instruction data retrieved beforehand from the program memory, the plurality of defined points within the instruction queue unit starting up selectively if the instruction data are written into the instruction queue unit and/or the instruction data are read out of the instruction queue unit.

Accordingly, it is provided that the instruction queue is configured such that, when instruction data are written into the instruction queue and/or when instruction data are read out of the instruction queue, a plurality of defined points within the instruction queue are made to start up selectively, and that the instruction queue is configured such that, when instruction data are written into the instruction queue and/or when instruction data are read out of the instruction queue, one of a plurality of defined points within the instruction queue is started up selectively in response to certain events.

The selective startability of a plurality of certain points within the instruction queue proves to be advantageous in two respects. First, because a plurality of instruction sequences can thus be stored in the instruction queue simultaneously but independently of one another, and second, because the instruction queue can thus also be used as an instruction cache.

Both of these factors contribute to the capability that the instruction data, needed by the instruction execution unit of the program-controlled unit, at the moment when they are needed are always or virtually always already or still available in the instruction queue and can be taken over from there immediately, that is, without waiting.

As a result, the incidence of pauses in program execution can be reduced to a minimum.

In accordance with an added feature of the invention, the instruction queue unit has an instruction queue buffer subdivided into multiple regions.

In accordance with an additional feature of the invention, each of the multiple regions of the instruction queue buffer stores the instruction data representing a plurality of instructions from the program memory.

In accordance with another feature of the invention, the instruction queue buffer is used entirely or partially as an instruction cache.

In accordance with a further added feature of the invention, the instruction queue unit has a predecode unit and the instruction data read out of the program memory are checked in the predecode unit to determine if the instruction data represent instructions whose execution can result in an occurrence of a non-address-sequential program sequence.

With the foregoing and other objects in view there is also provided, in accordance with the invention, an improved method for retrieving instructions for a program-controlled unit having an instruction queue unit for furnishing instruction data retrieved beforehand from a program memory, the improvement which includes: responding to certain events by starting up selectively one of a plurality of defined points within the instruction queue unit if at least one of the instruction data are written into the instruction queue unit and the instruction data are read out of the instruction queue unit.

In accordance with an added feature of the invention there is the step of predicting with the predecode unit on detecting the instruction whose execution can cause the occurrence of the non-address-sequential program sequence, an address from which a program execution should be continued in an event of the non-address-sequential program sequence occurring.

In accordance with an additional feature of the invention, there is the step of starting a reading out of further instruction data from the program memory that are to be executed if the instruction data capable of causing the non-address-sequential program sequence actually causes the occurrence of the non-address-sequential program sequence upon execution of the instruction data before the instruction data are executed after detecting the instruction data whose execution can result in the occurrence of the non-address-sequential program sequence.

In accordance with another feature of the invention, there is the step of writing in a new region of the instruction queue buffer the further instruction data read out of the program memory that are to be executed in the event of the occurrence of the non-address-sequential program sequence.

In accordance with a further added feature of the invention, there is the step of reading and storing a certain minimum number of additional instruction data in the instruction queue buffer that are to be executed, if the instruction data capable of causing the non-address-sequential program sequence does not cause the occurrence of the non-address-sequential program sequence, before implementing the starting a reading out step.

In accordance with another additional feature of the invention, there is the step of detecting the instruction data whose execution results in the occurrence of the non-addresse-sequential program sequence only if a certain condition is met, and determining with the predecode unit if and how further instructions still to be executed before or after the instruction data effect the certain condition.

In accordance with a concomitant feature of the invention, there is the step of outputting further instruction data representing a next instruction to be executed and sequential further instruction data representing a sequential next instruction when the instruction data are output from the instruction queue unit.

Other features which are considered as characteristic for the invention are set forth in the appended claims.

Although the invention is illustrated and described herein as embodied in an apparatus and a method for fetching instructions for a program-controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The single FIGURE of the drawing is a diagrammatic block diagram of a layout of an instruction queue unit of an instruction retrieval device of a microcontroller.

DESCRIPTION OF THE PREFERRED EMBODIMENTS

The apparatus and method described below are components of a program-controlled unit.

In the example here, the program-controlled unit is a 32-bit microcontroller. However, it should already be noted at this point that the apparatus and the method can also be employed arbitrarily in other microcontrollers and other program-controlled units, such as microprocessors, signal processors, etc.

The microcontroller in question (like every other program-controlled unit) has an instruction retrieval device, by which instruction data representing instructions are retrieved, or fetched, from a program memory and furnished to the program-controlled unit for execution by an instruction execution unit.

The instruction data representing an instruction are two or four bytes long, in this example; however, they can be arbitrarily much longer or shorter.

The instruction retrieval device includes an instruction queue unit with an instruction queue, in which instruction data representing a relatively large number of instructions can be buffer-stored.

Referring now to the single FIGURE of the drawing in detail, there is shown the instruction queue unit IQU that includes an instruction queue buffer IQB, a prefetch unit PFU, a fetch unit FU, and a predecoding and prediction unit (predecode unit) PDU. The instruction queue unit IQU is connected to a program memory PM and to the instruction execution unit EU, or more specifically the decoding stage of the instruction execution pipeline of the microcontroller.

The program memory PM may be provided inside and/or outside the microcontroller and may be formed by arbitrary memory devices, such as a ROM, a RAM, a flash, a tape, a diskette, a hard disk, a CD, etc.

The instruction queue unit IQU is configured to fetch instruction data representing instructions from the program memory PM on an ongoing basis and buffer-store them, and as needed, that is, if the execution of a particular instruction by the instruction execution unit EU is incipient, to output them to it.

The retrieval of the instruction data from the program memory PM is brought about by the prefetch unit PFU. It is the task of this unit to read instruction data representing instructions out of the program memory PM into the instruction queue unit IQU in advance as much as possible, that is, even before they are needed for execution, and buffer-store them there, more specifically in the instruction queue buffer IQB. Reading is done in the normal case from successive addresses of the program memory PM. This is done as fast as possible and is interrupted only if it is not possible to write any further data into the instruction queue buffer IQB.

In this example, the instruction queue buffer IQB is subdivided into four regions 1–4 of equal size and has a total capacity of 64 bytes. Writing into the instruction queue buffer IQB is done, given address-sequential program execution, by the so-called round robin process. In this, the buffer regions 1–4 are filled repeatedly and in succession, that is, buffer region 1 first, then buffer region 2, then buffer region 3, then buffer 4, and then buffer region 1 again, and so forth. However, access can be made selectively in a very targeted way to the individual buffer regions 1–4 both when data are being written into the instruction queue buffer IQB and when they are read out of it. Accordingly a plurality of defined points can be started selectively within the instruction queue buffer IQB that represents the instruction queue. As to be described later in more detail, in this example when address jumps are expected or performed, use is made of this possibility in the program sequence. However, it should already be noted at this point that if needed, the possibility can also be exploited at arbitrary other occasions, and that the highly advantageous selective startability of the plurality of defined points within the instruction queue buffer can also be achieved without subdividing the instruction queue buffer into a plurality of regions.

The data read out of the program memory PM are not, however, written directly into the instruction queue buffer IQB but rather are first written into the predecode unit PDU preceding it, and more specifically into an instruction data register IRB provided for the purpose. Then (in the next clock cycle), the instruction data are analyzed by the predecode unit PDU and entered into the instruction queue buffer IQB, or shunted directly into the instruction execution unit EU (the decoder stage of the instruction execution pipeline) of the microcontroller, bypassing the instruction queue buffer.

In the analysis done in the predecode unit PDU, the applicable instruction data are decoded and checked for whether, when executed later on in the instruction execution unit EU, they will or can cause a non-address-sequential program sequence, as is the case for instance with unconditional and conditional jump instructions, subroutine calls, interrupts, reverse jump instructions, and the like.

If the predecode unit PDU detects an instruction whose consequence is or can be a non-address-sequential program sequence, then it ascertains where the program execution should be continued in the event of a non-address-sequential program sequence and, even before the applicable instruction is executed, orders the commencement of the readout of instructions from the program memory PM that are to be executed. If the instruction that could cause the non-addresse-sequential program sequence does in fact, during execution, cause a non-address-sequential program sequence, the instruction data read in this process are written into a new region of the instruction queue buffer IQB.

The reading of instructions that, in the event of a non-addresse-sequential program sequence, are to be executed after the instruction that causes the non-address-sequential program sequence is preferably not begun until a certain minimum number of instructions that are to be executed if the instruction capable of causing the non-address-sequential program sequence does not cause any non-address-sequential program sequence is stored in the instruction queue buffer IQB. To that end, first one or more further address-sequential instruction fetching operations from the program memory PM should optionally be performed. In this way, even in the event of an incorrect prognosis by the predecode unit PDU, or in the event that the jump instruction or the like detected is a conditional jump or the like that has not been executed, one or more instructions that would be executed, if the instruction capable of causing the non-address-sequential program sequence would not cause a non-address-sequential program sequence, are available for immediate retrieval.

If the predecode unit PDU has detected a conditional jump instruction or the like, then monitoring is preferably done as to whether and optionally how the instructions, to be executed or executed before that, affect the jump condition. By this, incorrect predictions by the predecode unit PDU can be detected early and corrected.

If a first jump instruction is followed immediately or later by a second jump instruction, then the described processes are repeated, but the data read from the second jump destination on are written into still another different region of the instruction queue buffer IQB.

The instruction data retrieved from the program memory PM by the prefetch unit PFU and taken to the instruction queue unit IQU are fed as needed. That is, if the execution of the applicable instructions is incipient, by the fetch unit FU from the instruction queue unit IQU to the instruction execution unit EU of the microcontroller, or more specifically to the decoding stage of the instruction execution pipeline. The fetch unit FU fetches the instruction data required, either from the instruction queue buffer IQB or from the instruction data register IRB of the predecode unit PDU. In the process, the fetch unit first checks whether the desired instruction data are already available at one of the aforementioned points in the instruction queue unit IQU. If so, it orders them to be output to the instruction execution unit. If the instruction data required are not yet ready in the instruction queue unit IQU, then the fetch unit FU orders the corresponding data to be retrieved from the program memory PM. Until the instruction arrives, the program execution is interrupted; the fetch unit FU generates waiting cycles during this time. However, because of the novel instruction queue and the mode in which it is operated, such cases either do not occur at all or occur only extremely rarely.

In certain cases, it proves to be advantageous if the fetch unit FU retrieves not only the instruction needed but at the same time the instruction following it from the instruction queue unit. Then the so-called zero-cycle jumps, and for instance in so-called MAC (multiply and accumulate) loops in digital filters can be executed extremely efficiently.

It is understood that both the number of regions into which the instruction queue buffer IQB is subdivided and their size can be modified arbitrarily compared with the example in question and thus adapted to given conditions. It may also prove to be advantageous if it is provided that the user of the program controlled unit can configure the instruction queue buffer by himself to suit his expectations.

The use of the instruction queue buffer IQB described can be made even more efficient than is already the case, if to generate the instruction data a special compiler is used that is configured not to allow too many jump instructions to follow one another and/or to vary jump conditions at times and in a way such that they can be detected reliably and simply by the predecode unit PDU, and/or to make frequently performed loops and subroutines as short as possible, and so forth.

A further improvement in efficiency can be attained if the instruction queue, or the instruction queue buffer IQB representing it, is used not only as an instruction waiting line but also as an instruction cache. Because of the four buffer regions 1–4 of the instruction queue buffer IQB, the instruction cache has four fully associated cache banks. Since each buffer region can be arbitrarily assigned an address, instruction sequences of various addresses that include up to 4×16 bytes can be stored in the four buffer regions 1–4. The effect of this, particularly with (repeatedly performed) short subroutines, short loops (such as the MAC loops in programming for digital filtration) and in audits (for instance brought about by switch/case inquiries in C programs), is to increase the speed.

Because of the four buffer regions 1–4 of the instruction queue buffer IQB, it is possible, when at least two successive jump instructions occur, to furnish the instruction data, stored at the sequential addresses of the jump instructions and the instruction data stored at the respective jump destinations, in the instruction queue.

Thus even after jump instructions, the instruction execution unit EU of the microprocessor can immediately, that is, without any waiting time, be supplied with the instruction data representing the next instruction or instructions to be expected at that time.

The apparatus and method described thus make it possible to reduce the incidence of pauses in program execution to a minimum.

I claim:

1. An apparatus for retrieving instructions for a program-controlled unit having a program memory, comprising:
    an instruction queue unit having a plurality of defined points for storing and furnishing instruction data retrieved beforehand from the program memory, said plurality of defined points within said instruction queue unit starting up selectively when at least one of the instruction data are written into said instruction queue unit and the instruction data are read out of said instruction queue unit, said instruction queue unit has an instruction queue buffer subdivided into multiple regions wherein each of said multiple regions of said instruction queue buffer stores the instruction data representing a plurality of instructions from the program memory.

2. An apparatus for retrieving instructions for a program-controlled unit having a program memory, comprising:
    an instruction queue unit having a plurality of defined points for storing and furnishing instruction data retrieved beforehand from the program memory, said plurality of defined points within said instruction queue unit starting up selectively when at least one of the instruction data are written into said instruction queue unit and the instruction data are read out of said instruction queue unit wherein said instruction queue buffer is used entirely as an instruction cache.

3. An apparatus for retrieving instructions for a program-controlled unit having a program memory, comprising:
    an instruction queue unit having a plurality of defined points for storing and furnishing instruction data retrieved beforehand from the program memory, said plurality of defined points within said instruction queue unit starting up selectively when at least one of the instruction data are written into said instruction queue unit and the instruction data are read out of said instruction queue unit wherein said instruction queue buffer is used partially as an instruction cache.

4. An apparatus for retrieving instructions for a program-controlled unit having a program memory, comprising:
    an instruction queue unit having a predecode unit and a plurality of defined points for storing and furnishing instruction data retrieved beforehand from the program memory, said plurality of defined points within said instruction queue unit starting up selectively when at least one of the instruction data are written into said instruction queue unit and the instruction data are read out of said instruction queue unit and checked in said predecode unit to determine if the instruction data represent instructions whose execution will result in an occurrence of a non-address-sequential program sequence.

5. The apparatus according to claim 4, wherein said predecode unit on detecting the instruction data whose execution will result in the occurrence of the non-addresse-sequential program sequence, predicts an address from which onward program execution should be continued in an event of the non-address-sequential program sequence occuring.

6. An improved method for retrieving instructions for a program-controlled unit having an instruction queue unit for furnishing instruction data retrieved beforehand from a program memory, the improvement which comprises:
    responding to certain events by starting up selectively one of a plurality of defined points within the instruction queue unit if at least one of the instruction data are written into the instruction queue unit and the instruction data are read out of the instruction queue unit;
    providing the instruction queue unit with an instruction queue buffer and subdividing the instruction queue buffer into multiple regions; and
    configuring each of the multiple regions of the instruction queue buffer to store the instruction data representing a plurality of instructions from the program memory.

7. An improved method for retrieving instructions for a program-controlled unit having an instruction queue unit for furnishing instruction data retrieved beforehand from a program memory, the improvement which comprises:
    responding to certain events by starting up selectively one of a plurality of defined points within the instruction queue unit if at least one of the instruction data are written into the instruction queue unit and the instruction data are read out of the instruction queue unit by using the instruction queue buffer entirely as an instruction cache.

8. An improved method for retrieving instructions for a program-controlled unit having an instruction queue unit for furnishing instruction data retrieved beforehand from a program memory, the improvement which comprises:
    responding to certain events by starting up selectively one of a plurality of defined points within the instruction queue unit if at least one of the instruction data are written into the instruction queue unit and the instruction data are read out of the instruction queue unit by using the instruction queue buffer partially as an instruction cache.

9. An improved method for retrieving instructions for a program-controlled unit having an instruction queue unit for furnishing instruction data retrieved beforehand from a program memory, the improvement which comprises:
    responding to certain events by starting up selectively one of a plurality of defined points within the instruction queue unit if at least one of the instruction data are written into the instruction queue unit and the instruction data are read out of the instruction queue unit; and
    checking the instruction data read out of the program memory in a predecode unit for determining if the instruction data represent an instruction whose execution can result in an occurrence of a non-address-sequential program sequence.

10. The method according to claim 9, which comprises predicting with the predecode unit on detecting the instruction whose execution will cause the occurrence of the non-address-sequential program sequence, an address from which a program execution should be continued in an event of the non-address-sequential program sequence occurring.

11. The method according to claim 9, which comprises starting a reading out of further instruction data from the program memory that are to be executed if the instruction data capable of causing the non-address-sequential program sequence actually causes the occurrence of the non-address-sequential program sequence upon execution of the instruction data before the instruction data are executed after detecting the instruction data whose execution will result in the occurrence of the non-address-sequential program sequence.

12. The method according to claim 11, which comprises writing in a new region of the instruction queue buffer the further instruction data read out of the program memory that are to be executed in the event of the occurrence of the non-addresse-sequential program sequence.

13. The method according to claim 11, which comprises reading and storing a certain minimum number of additional instruction data in the instruction queue buffer that are to be executed, if the instruction data capable of causing the non-addresse-sequential program sequence does not cause the occurrence of the non-address-sequential program sequence, before implementing the starting a reading out step.

14. The method according claim 9, which comprises detecting the instruction data whose execution results in the occurrence of the non-address-sequential program sequence only if a certain condition is met, and determining with the predecode unit if and how further instructions still to be executed before the instruction data effect the certain condition.

15. The method according claim 9, which comprises detecting the instruction data whose execution results in the occurrence of the non-address-sequential program sequence only if a certain condition is met, and determining with the predecode unit if and how further instructions executed after the instruction data affect the certain condition.

16. An improved method for retrieving instructions for a program-controlled unit having an instruction queue unit for furnishing instruction data retrieved beforehand from a program memory, the improvement which comprises:
  responding to certain events by starting up selectively one of a plurality of defined points within the instruction queue unit if at least one of the instruction data are written into the instruction queue unit and the instruction data are read out of the instruction queue unit; and
  outputting further instruction data representing a next instruction to be executed and sequential further instruction data representing a sequential next instruction when the instruction data are output from the instruction queue unit.

\* \* \* \* \*